Sept. 5, 1961 E. R. SCHWARTZ 2,998,890
TRUCK BED HOLD-DOWN LATCH APPARATUS
Filed Dec. 7, 1959 3 Sheets-Sheet 1
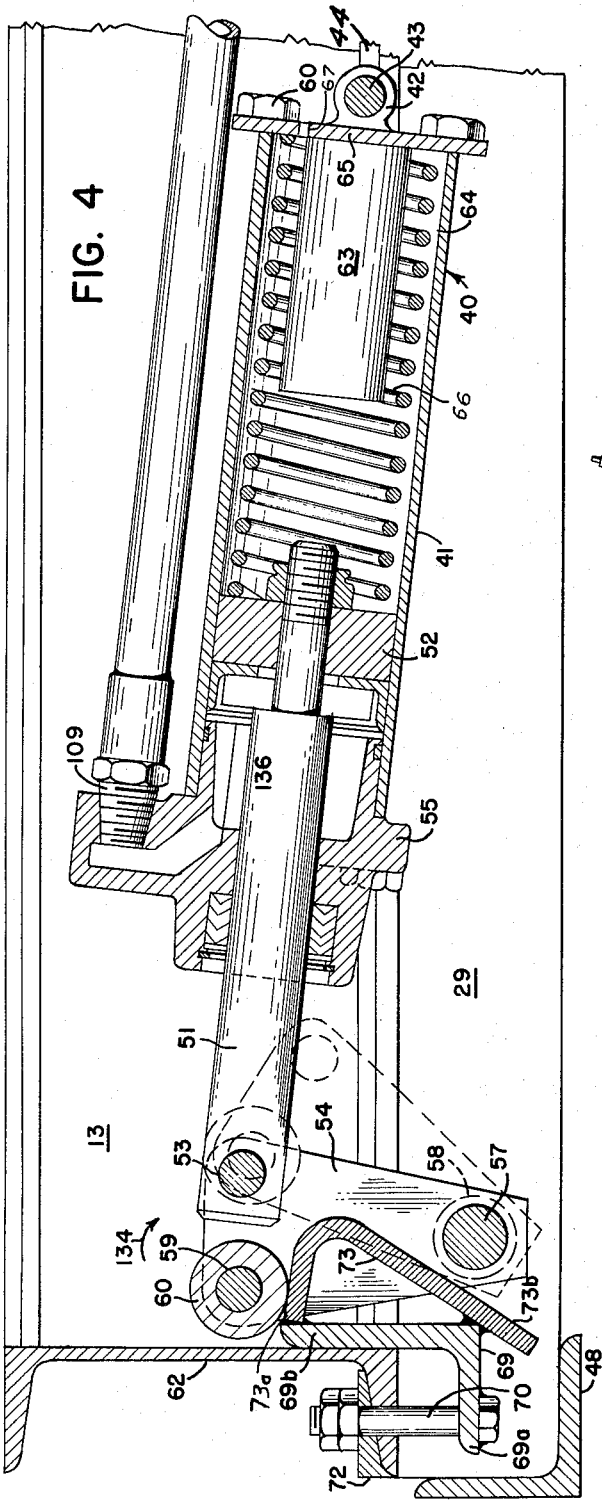
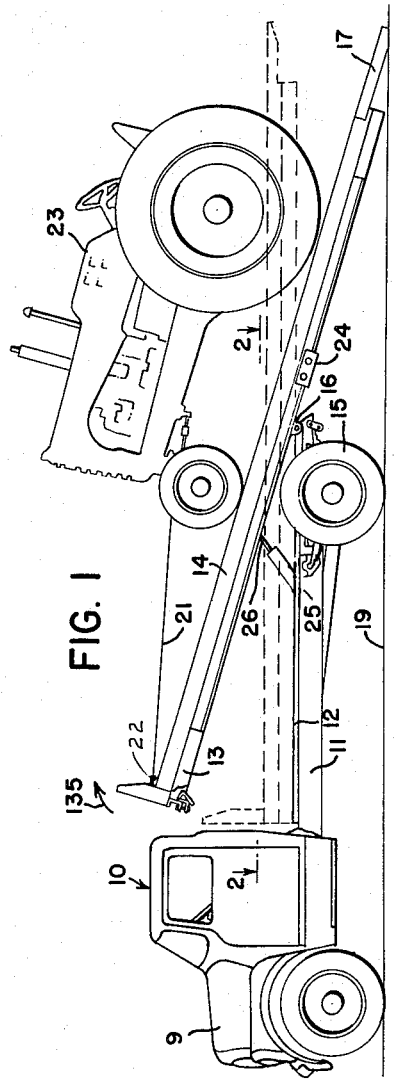
INVENTOR.
ELMER R. SCHWARTZ
BY *Duggert Johnson*
ATTORNEYS Sept. 5, 1961
E. R. SCHWARTZ
2,998,890
TRUCK BED HOLD-DOWN LATCH APPARATUS
Filed Dec. 7, 1959
3 Sheets-Sheet 2
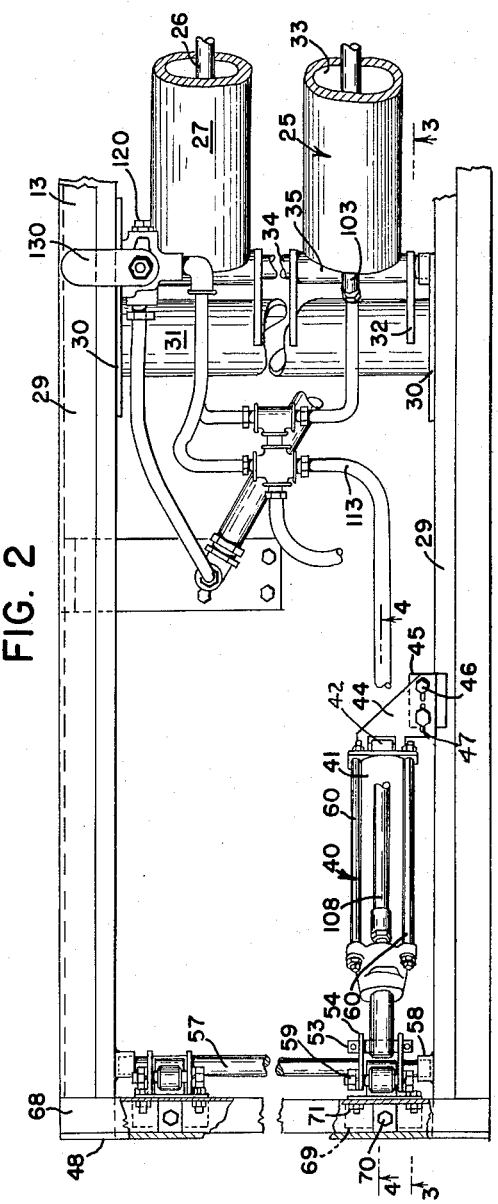
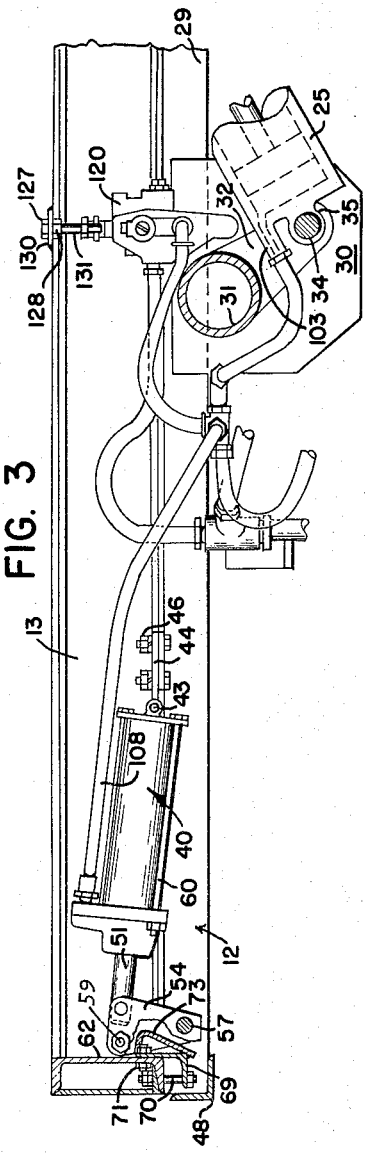
*INVENTOR.*
ELMER R. SCHWARTZ
BY *Dugger & Johnson*
ATTORNEYS

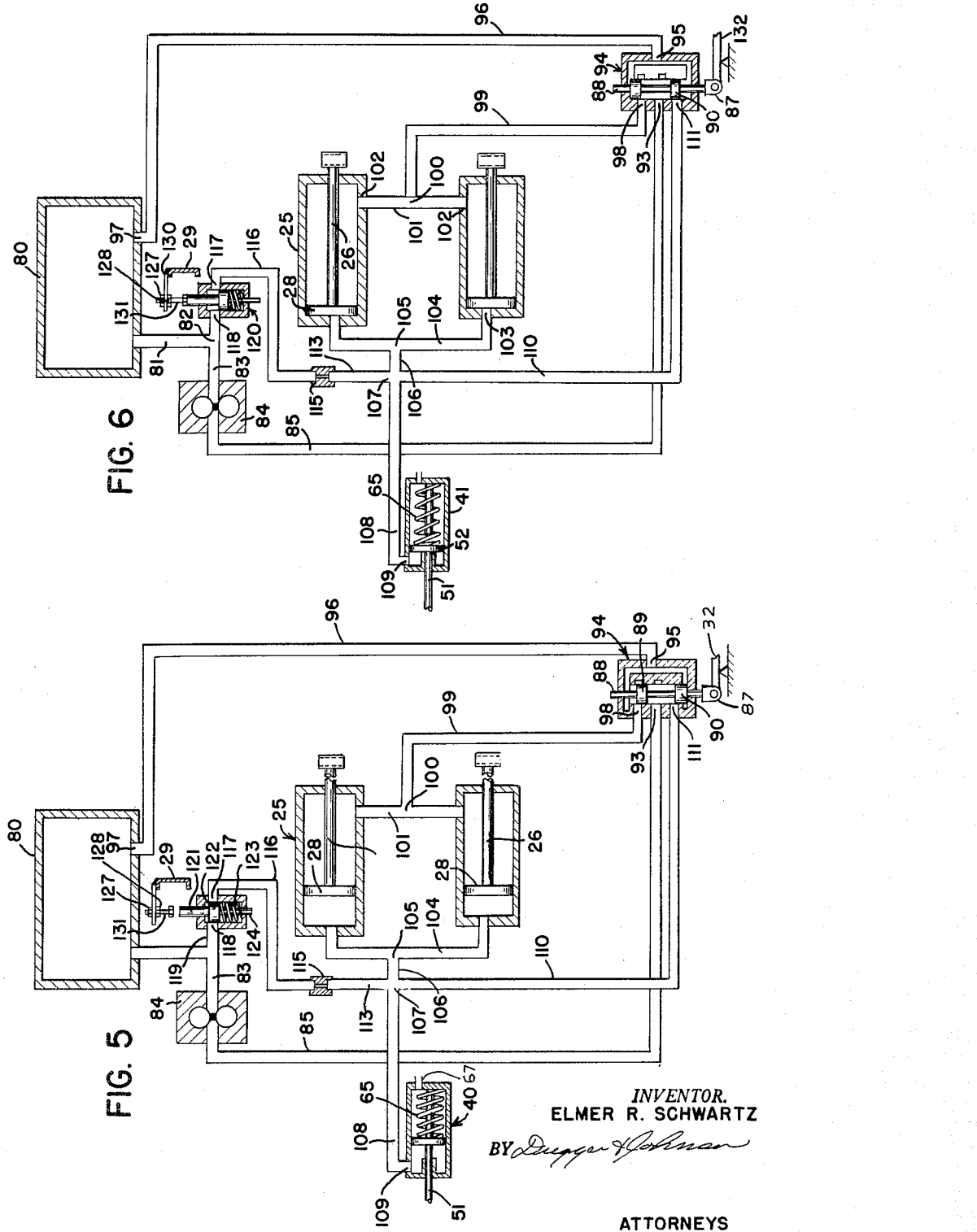

United States Patent Office 2,998,890
Patented Sept. 5, 1961

2,998,890
TRUCK BED HOLD-DOWN LATCH APPARATUS
Elmer R. Schwartz, Lester Prairie, Minn.
Filed Dec. 7, 1959, Ser. No. 857,799
9 Claims. (Cl. 214—505)

This invention relates to a new and improved latch apparatus for releasably holding a truck platform in a down position. More particularly this invention relates to hydraulically operated latch apparatus powered from the truck hoist hydraulic system for releasably holding a tiltable truck platform in a horizontal extending position.

It is an object of this invention to provide new and improved latch apparatus for releasably holding a tiltable truck platform in a down position. It is a further object of this invention to provide new and improved latch apparatus powered from the truck hoist hydraulic circuit and operated by operating the platform hoist controls for releasably holding a truck platform in a down position.

Other and further objects of the invention are those inherent in the invention herein illustrated, described and claimed, and will be apparent as the description proceeds.

To the accomplishment of the foregoing and related ends, this invention then comprises features hereinafter fully described and particularly pointed out in the claims, the following description setting forth in detail certain illustrative embodiments of the invention, these being indicative, however, of but a few of the various ways in which the principles of the invention may be employed.

The invention is illustrated in the drawings in which the corresponding numerals refer to the same parts and in which:

FIGURE 1 is a side view of a truck having a heavy wheel vehicle partially loaded thereon, the truck platform being shown in a load position in solid lines, and in a down position in dotted lines;

FIGURE 2 is an enlarged fragmentary horizontal sectional view of the structure beneath the truck platform, said view showing the latch hold-down assembly in a latched condition and the hydraulic connections to said assembly, and being taken along the line and looking in the direction of the arrows 2—2 of FIGURE 1;

FIGURE 3 is a vertical sectional view of a latch hold-down assembly and the hydraulic components illustrated in FIGURE 2, said view being generally taken along the line and looking in the direction of the arrows 3—3 of FIGURE 2;

FIGURE 4 is an enlarged vertical sectional view of the latch hold-down assembly illustrated in FIGURE 3, said latch hold-down assembly being shown in a latched condition in solid lines and in an unlatched condition in dotted line, said view being taken along the line and looking in the direction of the arrows 4—4 of FIGURE 2;

FIGURE 5 is a schematic illustration of the latch hold-down assembly, the hydraulic circuitry and hydraulic components of this invention, said illustration showing various components in a platform lowering position;

FIGURE 6 is a schematic illustration of the latch hold-down assembly, the hydraulic circuitry, and the hydraulic components of FIGURE 5, said illustration showing the hydraulic components in a platform raising position.

In trucks having elongated platforms that extend a substantial distance rearwardly of the rear wheels so that said platforms may be readily raised to a position to, in part, serve as a ramp for loading heavy vehicles on said platforms, there is present the problem of providing suitable apparatus for releasably holding a truck platform in a latched down position. Hand operated latch hold-down apparatus of the prior art in many instances does not prove adequate since in the event the major portion of the weight of the vehicle is carried rearwardly of the rear wheels, the latch apparatus in a latched condition frequently requires that considerable force be exerted by the operator for unlatching said latch apparatus. Further if the truck platform is not in a fully down position, it is quite difficult to move by hand the latch apparatus to a latched condition wherein said apparatus retains a truck platform in a tightly latched down position. It is to overcome the aforementioned problems without requiring an additional hydraulic pump and hand operated controls other than those used to operate and control the platform hoist, that this invention has been made.

Referring now to FIGURE 1, there is illustrated a truck, generally designated 10, having front and rear wheels 15, chassis 11, a subframe 12 mounted on the chassis to extend rearwardly of the cab 9, a platform frame 13 pivotally secured at 16 to the subframe and a platform 14 secured to the platform frame. It is to be noted that the length of the portion of the platform forward of the rear wheels is less than the portion rearwardly of said wheels and that the portion of the platform forward of the pivot 16 is almost as long as the portion rearward of said pivot. An approach plate 17 is secured to the platform in a manner to form an extension of said platform to facilitate the loading onto the platform of a heavy object such as a tractor 23.

A hoist cable 21 having one end thereof connected to appropriate hydraulic operated apparatus (not shown) is extended over the front sheave 22 and at the other end connected to the tractor. By operating appropriate controls located at the control panel 24, the aforementioned hydraulic operated apparatus may be actuated to pull a tractor onto the platform when the platform is in a tilted condition such as illustrated in full lines in FIGURE 1. Also located at the control panel are suitable controls which will be described hereinafter for actuating the tandem piston-cylinder combinations 25 for selectively raising and lowering the truck platform.

Each of the aforementioned piston cylinder combinations include a piston 28, a piston rod 26 connected to the piston 28 and pivotally connected to a cross bar (not shown) that forms a portion of the platform frame 13, said cross bar being located forwardly of, but adjacent to, the rear wheels, and a cylinder 27 having a transversely extending sleeve 35 welded to one end thereof. The structure for mounting the piston cylinder combination includes the above mentioned cross bar, a pair of plates 30, one plate welded to each of the longitudinally extending subframe members 29 of the platform frame, a heavy tubular cross brace 31 welded at its opposite ends to the respective plates 30, a transverse rod 34 welded at its opposite ends to the aforementioned plates, said transverse rod being located at a lower elevation and rearwardly of the tubular cross brace, and a plurality of spaced depending braces 32, each brace 32 being at one end welded to brace 31 and at the other secured to rod 34. The sleeves 35 are rotatably mounted in spaced relation on the transverse rod, each sleeve being located intermediate a pair of braces 32.

Mounted on the forward end of the subframe 12 is the hydraulically operated latch hold-down assembly of this invention, said assembly being generally designated 40. The latch assembly includes a cylinder sleeve 41, a cylinder head 55, a back cylinder plate 65, and bolts 60 for holding members 41, 55 and 65 in assembled relationship. A transverse sleeve 42 is welded to the plate 65 and is pivotally secured to the angle bracket 44 by pivot member 43. The angle bracket in turn is secured in an adjusted position on the mounting plate 45 by bolts 46, said bolts being extended through elongated longitudinal slots 47 formed in the mounting plate and appropriate apertures in the angle bracket. The angle bracket in turn is secured in an adjusted position on the mounting plate 45 by bolts 46, said bolts being extended through elongated slots 47 formed in the mounting plate. The mounting plate is welded to the longitudinally extending subframe member 29 intermediate the tubular brace 31 and the angle iron 48 which is the forward transverse member of the subframe.

The subframe includes the aforementioned spaced longitudinal frame members 29, cross braces 34, 31 and the transversely extending angle iron 48 which is welded at either end to the front end of the respective longitudinally extending members 29. Welded to each of the frame members 29 rearwardly of the angle iron but adjacent thereto is a retainer sleeve 58 which each rotatably support one end of the latch rod 57. Fixedly secured in spaced relation to either end of the rod 57 adjacent a sleeve 58 are a pair of the generally trapezoid shaped plates 54, said plates being connected to the rod at their narrow base portions. A pivot bolt 53 is retained in one of the corner portions of each pair of plates 54 opposite the narrow base. Similarly a pivot bolt 59 is mounted in the opposite corner portions of each pair of plates to rotatably mount a roller 60 between said each pair of plates.

One end of the piston rod 51 is rotatably mounted on one of the pivots 53, said piston rod extending longitudinally thru the cylinder head 55 and being secured at its opposite ends to the piston 52. The piston in turn is mounted in the cylinder sleeve 41. Since the trapezoidal plates are fixedly secured to the rod 57 actuation of the piston 52 will cause the piston rod to rotate one set of trapezoidal plates about the rod 57, said rod 57 in turn rotating the trapezoid plates mounted on the other end of the rod.

A cylindrical rod 63 is mounted within the cylinder 41 to be concentric therewith and form an annular space 64 therein, one end of the rod being secured to the cylinder plate 65. The members 63, 41, and 65 form a seat for the inner end of the coiled spring 66 while the opposite end of said coiled spring bears against the piston, said spring constantly urging the piston and piston rod to an extended position. A port 67 is formed in the cylinder plate to permit fluid flow between the annular space 64 and the atmosphere. The cylindrical rod limits the rearward movement of the piston in the cylinder.

Bolted to each end of the channel 62, which forms the front frame member of the platform frame, adjacent each set of trapezoidal plates is an angle bracket 69, there being a bolt 70 extended thru the horizontal leg of the angle bracket, the bearing plate 72, and the horizontal leg of the channel. The bearing plate 72 provides a level bolting surface. A pair of bolts 71 secure together the vertical portions of the channel iron and the mounting bracket.

To each angle bracket 69 there is welded a generally L-shaped latch member 73 of a transverse width to extend between a pair of trapezoidal plates. The latch members have one leg 73a extending in a general rearwardly direction from the upper end of the vertical leg of the angle bracket and then are bent to extend downwardly and rearwardly to form the inclined leg 73b, the leg 73b being welded to the angle bracket adjacent the juncture of the horizontal leg 69a with the vertical leg 69b. As may be noticed in FIGURES 2 to 4 inclusive, the latch bracket 73 is mounted so that when the platform frame is in a down position and the piston rod is in an extended position, the latch bracket extends rearwardly a sufficient distance to cross a plane in which the rotation axes of rods 57 and rollers 60 are located.

The hydraulic apparatus for operating the latch holddown piston-cylinder includes a reservoir 80 that is connected by line 81 to junction 82 and thence by line 83 to the pump 84. The pump is connected by line 85 to the first port 93 of the master control valve generally designated 94. A second port 95 of the aforementioned valve is connected by line 96 to the port 97 of the reservoir. The master control valve has a third port 98 connected by line 99 to the junction 100, said junction in turn being connected by a line 101 to a port 102 formed in the outer end of a hoist or lift cylinder 25. The junction 100 also is connected by a second line 101 to a port 102 of the second lift cylinder.

Each of the lift cylinders has a port 103 formed in the respective opposite ends from the port 102, port 103 being connected by line 104 to junction 105. Junction 105 in turn is connected by line 106 to the junction 107. A line 108 connects the junction 107 to the port 109 that is formed in the cylinder head 55 of the latch cylinder 41. The junction 107 is also connected via line 110 to the fourth port 111 of the master control valve, and via line 113 to one side of the fixed orifice type of restrictor 115. The opposite side of the restrictor is connected via line 116 to the first port 117 of the spool valve 120 while the second port 118 of the spool valve is connected through line 119 to junction 82. Any type of restrictor will work as long as it restricts flow toward the low pressure side of the hydraulic system.

The spool valve 120 is secured to the plate 130. The spool valve includes a valve member 122 having an elongated rod 124 secured thereto and extended outwardly through one side of the valve casing and a second rod 121 secured to the opposite side of the valve member and extended upwardly through the opposite side of the valve casing. A coil spring 123 is mounted on the rod 124 to have one end of the spring bear against the valve casing wall and the other end bear against the valve member to constantly urge said valve member to a position to block the fluid channel from port 117 through the valve to port 118.

A support plate 130 is welded at one end to the longitudinal frame member 29. A bolt 131 is secured to the opposite end of the support plate in position to bear against the rod 121 and thereby force the valve member 122 to a position to open the fluid channel between the ports 117 and 118 when the truck platform is in a down position. Nuts 127, 128 are threaded on the bolt on either side of the support plate to form means for adjustably varying the effective length of the bolt 131 and thereby the application of the full fluid pressure to the back end of cylinders 25 for lifting the platform.

The master control valve 94 includes a valve rod 88 having a first valve member 89 attached to one end of the rod and a second valve member 90 mounted on the opposite end of the rod in spaced relation to the first valve member. The aforementioned valve members 89, 90 are located on rod 88 in a position to block a fluid flow path through each of the ports 98, 111 respectively when valve lever 132 has been moved to a neutral position, said lever being connected to clevis 87 of the valve rod 88. The lever is mounted at the control panel 24.

The ports 111, 93, 98, and 95 are located with respect to the valve members 89, 90 so that when the lever 132 is moved to a truck hoist position (see FIGURE 5), one fluid flow channel is established between port 98 and port 95 and a second fluid flow channel is established between port 93 and port 111. When the valve lever 132 is moved to a position for lowering a truck platform to a down position (see FIGURE 6), a fluid flow channel is established between ports 93, 98 and a second fluid flow channel between ports 111, 95.

The structure of my invention having been set forth, I will now briefly describe the operation thereof. Assuming that the truck 10 has been driven to a location whereat a heavy wheeled vehicle such as a tractor is to be loaded on the truck, the lever 132 is moved to a platform raising position to establish the fluid flow channels of the master control valve as illustrated in FIGURE 6. However, prior to establishing the aforementioned fluid channels, the valve 120 and latch cylinder are as illustrated in FIGURE 6. Upon moving lever 132 to a platform raising position, fluid is pumped from the reservoir by the pump 84 through ports 93 and 111 to the junction 107. At this time part of the pressurized fluid flows through line 108 to the head end of the cylinder 41 to move the piston rod and piston 51, 52 to a retracted position. The piston rod in being moved to a retracted position rotates the trapezoid plates to a dotted line position as illustrated in FIGURE 4 and thereby moving the rollers 60 rearwardly of the L shaped latch member 73. As a result, the front end of the truck platform and platform frame may be rotated in an upward direction relative to the subframe. At the same time as fluid is being applied to the latch cylinder, fluid is being pumped thru junction 107 into the back end of the piston-cylinders 25 to start forcing the piston and piston rod 26 to an extended position for pivoting the truck platform about the pivot 16 (direction of arrow 135). Additionally part of the fluid under pressure at junction 107 flows back thru lines 113, 116 to the reservoir and to the inlet side of the pump; however, restrictor 115 limits the fluid flow through lines 113, 116 sufficiently to provide sufficient fluid pressure for initially starting to raise the truck platform and to move the latch hold-down assembly to an unlatched condition.

After the latch hold-down assembly is in an unlatched condition and the truck platform has been initially rotated from a horizontal condition sufficiently to lift bolt 131 out of engagement with the rod 121, thereby permitting the coiled spring 123 to force the valve member 122 upwardly to block the fluid flow channel through ports 117, 118 all the fluid pumped by the pump passes thru junction 107 and ports 103 to the lift cylinders to continue to pivot the platform about pivots 116.

After the truck platform has been sufficiently raised so that the approach plate 17 rests on the surface 19, lever 132 is moved to a neutral position whereby the valve members 89, 90 block the respective ports 98, 111 thereof and the hoist cable 21 is drawn to an extended position and attached to the frame of the tractor which is to be loaded on the platform. The appropriate hydraulic operated mechanism (not shown) is now actuated for retracting the hoist cable and thereby pulling the tractor toward the front end of the truck platform.

After the tractor has been moved to a forward position on a truck platform, lever 132 is moved to a platform lowering position whereby fluid is forced by the pump through port 93, to port 98 and then into ports 102 of the lift cylinders. At this time the valve member 122 still closes the fluid channel between ports 117 and 118, and thus the pistons 28 in moving to a retractive position force fluids outwardly thru ports 103 to ports 111, 95 and then back to the reservoir. When the truck platform is moved to within close proximity of the down position, the plunger bolt 131 engages rod 121 and thereby forces the valve member 122 to an open position to establish a fluid flow channel thru valve 120 between ports 117, 118 back to the inlet side of the pump and to the reservoir. After the platform has been fully lowered, the valve lever is moved to a neutral position and thereby blocking the fluid channels thru port 98, 111 respectively. As a result, the fluid in the head ends of the cylinders 25 hold the pistons 28 in a retracted position, however, the fluid pressure contained in the opposite ends of the lifting cylinders and in the head end of the latch cylinder is "bled off" through restrictor 115 to the reservoir. As a result of providing the latch cylinder "bled off" fluid channel, the spring 65 urges piston 52 in an extended position which in turn moves the latch mechanism to a latched condition and retains said latches in a latched position as illustrated in solid lines in FIGURE 4. The port 67 permits air to freely flow into and out of the back end of the cylinder as the thru piston 52 is moved. From the aforegoing it may be noted that the restrictor 115, valve 120 and lines 113, 116, 119, when said valve is open, permit the latch cylinder to be "bled off" after the single hydraulic latch and hoist control lever has been operated; and yet holds back enough fluid to start the lift piston cylinders up when the lever is moved to a platform raise position. When the spool valve is closed, the fluid flow into the piston cylinders 25 is normal. Also it is to be noted that the truck platform in moving to a horizontal position the inclined leg 73b will force the roll and thereby the piston 52 to a retracted position.

Providing a power operated latch hold-down assembly is important since many times the "load" being carried has a center of gravity that is located rearwardly of the pivot axis of pivot 16. As a result, the weight of the load being carried constantly urges the platform to pivot in a direction whereby the truck platform moves to a raised position. In such an event it is difficult, if not impossible, for the truck driver to use conventional hand operated latch hold-down mechanism for releasing a latch hold-down assembly. In using hydraulically operated latch hold apparatus, if a restrictor were not provided in the hydraulic circuit such as disclosed or more complicated apparatus used, the fluid pressure in the latch cylinder would hold the latch apparatus in an unlatched position and thereby prevent the latch assembly from assuming a latched position. However, by providing a restrictor fluidly connected in hydraulic circuit of the piston-cylinder combinations, a "bleed off" channel is provided and fluid pressure may be obtained to force the latch apparatus to an unlatched position and to initially start the lift piston-cylinders moving the truck platform to a tilted condition. As a result providing a coiled spring 65, having proper spring characteristics and the aforementioned restrictor, the latch piston moves a sufficient distance to be in an unlatched condition before sufficient pressure is exerted on piston 23 to start the platform moving to a tilted position, the weight of the platform providing sufficient force opposing the movement of pistons 28 prior to the time the latch piston is moved into engagement with the cylindrical rod. Also the restrictor prevents excessive fluid pressure buildup in the cylinders 25 and damage to the hydraulic system in the event that the latch assembly should not be forced to an unlatched position.

It is to be understood that even though the latch apparatus of this invention has been described only with reference to a truck having a tiltable truck platform, its usage is not thus limited. For example it may be used in other hauling equipment such as wagons, trailers or trucks having dump boxes, tiltable platforms or similar structure. As an illustration of another usage of my invention, in stock trucks having a tiltable elongated box extending a substantial distance behind the pivot axis of the box, there is present the problem that the stock being hauled will crowd to the rear of the box which would cause the box to pivot about said axis if appropriate hold down latch apparatus were not provided. In such a case the apparatus of this invention would present among other advantages those that have been set forth heretofore.

As many widely apparent different embodiments of this invention may be made without departing from the spirit and scope thereof, it is to be understood that I do not limit myself to the specific embodiments herein.

What I claim is:

1. In a wheeled vehicle having a frame, a platform pivotally mounted on said frame for movement between an index position generally parallel to the frame and a tilted position, a first piston cylinder combination mounted on the frame for moving said platform between the tilted position and the index position, latch means for releasably retaining the platform in an index position, said latch means including a second cylinder piston combination, and hydraulic means connected to the aforementioned piston cylinder combinations for activating the respective piston cylinder combination, said hydraulic means including a reservoir, a pump having a high pressure side and a low pressure side fluidly connected to the reservoir, and means for fluidly connecting the high pressure side of the pump to the head end of the second cylinder and the back end of the first cylinder, means forming a fluid connection between the low pressure side of the pump and fluid connection means between the high pressure side of the pump and the head end of the second cylinder and the opposite end of the first cylinder for bleeding off fluid from said ends of the cylinders, said bleed-off means including a restrictor for limiting the rate of bleed-off, valve means for alternately preventing fluid flowing through the restrictor to the low pressure side of the pump and permitting fluid to flow through the restrictor to the low pressure side of the pump, said valve means including a valve member constantly urged to a position preventing the aforementioned flow of fluid through the resistor and means on the platform for retaining said valve means in a position to permit fluid bleed-off when the platform is in an index position.

2. In a wheeled vehicle having a frame, a platform pivotally mounted on said frame for movement from an index position generally parallel to the frame and a tilted position, a first piston cylinder combination mounted on the frame for moving said platform between a tilted position and an index position, latch means for releasably retaining the platform in an index position, said latch means including a second cylinder piston combination, and hydraulic means connected to each of the aforementioned cylinder combinations for activating the respective piston cylinder combination, said hydraulic means including a reservoir, a pump having a high pressure side and a low pressure side fluidly connected to the reservoir, first valve means fluidly connected to the high pressure side of the pump for selectively providing a fluid flow channel to apply fluid under pressure to the head end of the second cylinder for disconnecting the latching connection between the platform and the frame and the back end of the first cylinder for moving the platform away from the index position, and interrupting the fluid flow channel between high pressure side of the pump and the head end of the second cylinder and the back end of the first cylinder, and means fluidly connected between the fluid connection of the pump to the reservoir and the first valve means to the head end of the second cylinder and the back end of the first cylinder to bleed off the fluid in said ends of the cylinders when the valve means interrupts the flow of fluid between the pump and said cylinder ends, said second valve means including a valve mounted on the frame adjacent the truck platform in an index position and a member mounted on the platform for operating said valve.

3. In a vehicle having a frame, a platform mounted on said frame for movement between an index position generally parallel to the frame and a position at least in part elevated relative to the index position, a piston cylinder combination mounted on the frame for moving said platform between said positions, hydraulic means connected to the piston cylinder combination for activating said piston cylinder combination, said hydraulic means including a pump for pressurizing fluid, said pump having a high pressure side and a low pressure side, a line for conducting fluid connected at one end to the high pressure side of the pump, means for supplying fluid to the low pressure side of the pump, control means operable between three positions and connected between the opposite end of said line and the fluid supply means for alternately fluidly connecting said line to said piston cylinder combination in a first position to cause said piston cylinder combination to move the platform from the index position, to in a second position connect said piston cylinder combination to the fluid supply means to permit the platform moving to an index position and to in a third position block the flow of fluid between the piston cylinder combination and the pump and fluid supply means, and means connected to fluid supply means and to the connection of the control means to the piston cylinder combination for alternately providing a restricted fluid flow channel between the fluid supply means and the connection of the control means to the piston cylinder combination when the control means is in the third position and the platform is adjacent the index position and to provide a blocked fluid flow channel when the platform is out of a position adjacent to the index position, and means for operating the fluid channel means in the aforementioned manner.

4. The structure of claim 3 further characterized in that the fluid channel means includes a spool valve mounted in the frame and the operating means is mounted on the platform to engage the spool valve to provide an open fluid channel therethrough when the platform is adjacent the index position.

5. In a vehicle having a frame, a platform mounted on said frame for movement between an index position generally parallel to the frame and a position at least in part elevated relative to the index position, a latch bracket secured to said platform, a piston cylinder combination mounted on said frame, latch means operated by said piston cylinder combination for releasably engaging said latch bracket to releasably retain said platform in an index position, fluid actuating means mounted on the frame to move said platform between an index position and said elevated position, and means for applying fluid under pressure to actuate said fluid actuated means to move said platform between said index position and the elevated position and to actuate said piston cylinder combination to move said latch means from a latched condition, said fluid pressure applying means including a pump having a high pressure side and a low pressure side, a line for conducting fluid having one end connected to the high pressure side of the pump, means for supplying fluid to the low pressure side of the pump, control means connected between the opposite end of the line and the fluid supply means for alternately in a first position applying fluid under pressure to actuate said piston cylinder combination to operate said latch means to a release position to permit said platform being moved from an index position and a second position discontinuing the application of fluid under pressure to said piston cylinder combination, and means connected between the fluid means and the connection of the control means to the piston cylinder combination for alternately providing a restricted fluid flow channel between the fluid supply means and the connection of the control means to the piston cylinder combination when the platform is adjacent the index position to permit the latch means being moved to a latched condition upon the control means being operated to a second position and to provide a blocked fluid flow channel when the platform is out of a position adjacent to the index position, and means for operating the restricted fluid channel means in the aforementioned manner.

6. In a wheeled vehicle having a frame, a platform pivotally mounted on the frame for movement between an index position and a tilted position, fluid pressure actuated means operable for moving said platform between said positions, a latch for normally holding said platform against movement from said index position, fluid operated means for releasing said latch, a pressure source, a fluid connection to said fluid operated means, the improvement comprising valve means connected between said fluid connection and the pressure source for alternately conducting fluid under pressure between said fluid connection and the pressure source and preventing the flow of fluid under pressure from the pressure source to the fluid connection, means connected between the fluid supply means and the fluid connection for alternately permitting a restricted flow of fluid between the fluid connection and fluid supply means when the platform is adjacent the index position and providing a blocked fluid flow channel when the platform is remote from a position adjacent the index position, and means mounted on the platform for operating the fluid channel means in the aforementioned manner.

7. In a wheeled vehicle having a frame, a platform mounted on the frame for movement between an index position and a position at least in part elevated relative to said index position, fluid pressure actuated means operable for moving said platform between said positions, a pressure source for pressurizing fluid, said pressure source having a high pressure side and a low pressure side, a line for conducting fluid connected at one end to the high pressure side of the pressure source, second means connected to the low pressure side of the pressure source for supplying fluid to the pressure source, valve means connected between said line and the fluid actuated means for alternately conducting fluid under pressure to the fluid actuated means to actuate the last mentioned means to move the platform from the index position and preventing the flow of fluid to actuate said pressure actuator means, the improvement comprising means connected between the fluid supply means and the connection of the valve means to the fluid actuated means for alternately permitting a restricted flow of fluid from the fluid actuated means to the fluid supply means when the platform is adjacent the index position and providing a blocked fluid flow channel when the platform is remote from a position adjacent the index position, said vehicle having means for operating the restrictor fluid channel means in the aforementioned manner.

8. In fluid actuated mechanism on a wheeled vehicle for moving a platform from an index position to at least in part an elevation position, fluid actuated means for moving the platform between said positions, a pressure source for pressurizing fluid, said pressure source having a high pressure side and a low pressure side, second means for alternately conducting pressurized fluid from the high pressure side of said source to the fluid actuated means to actuate the last mentioned means to move the platform away from said index position and block the flow of fluid to the fluid actuated means, said second means being connected to the fluid actuated means, the improvement being a fluid return line having a restrictor and valve means connected in series, said fluid return line being connected between the connection of the second means to the fluid actuated means and the low pressure side of the pressure source, said valve means being operable between a position blocking said fluid line when the platform is remote from the index position and a second position opening said fluid return line to permit a restricted flow of fluid through said restrictor when the platform is adjacent said index position to return fluid to the pressure source and means for operating said valve means in the aforementioned manner.

9. In fluid actuated mechanism on a wheeled vehicle having a frame for moving a platform moveably mounted on the frame from an index position to an at least in part elevation position, fluid actuated means for moving the platform between said positions, a pressure source for pressurizing fluid, said pressure source having a high pressure side and a low pressure side, second means for alternately conducting pressurized fluid from the high pressure side of said source to the fluid actuated means to actuate the last mentioned means to move the platform away from said index position and block the flow of fluid to the fluid actuated means, said second means being connected to the fluid actuated means, normally latched latch means on the frame for releasably retaining the platform in an index position, second fluid actuated means for operating said latch means to a release position, a fluid connection between said second fluid actuated means and the connection of the second means to the other fluid actuated means for conducting pressurized fluid to actuate said second fluid actuated means to operate said latch means to a release position, the improvement being a fluid return line having a destrictor and valve means connected in series, said fluid return line being connected between the connection of the second means to the fluid actuated means and the low pressure side of the pressure source, said valve means being operable between a position blocking said fluid line when the platform is remote from the index position and a second position opening said fluid return line to permit a restricted flow of fluid through said restrictor when the platform is adjacent said index position to return fluid from the second fluid actuated means to the pressure source, and means for operating said valve means in the aforementioned manner.

References Cited in the file of this patent

UNITED STATES PATENTS

| | | |
|---|---|---|
| 2,027,421 | Eisenberg | Jan. 14, 1936 |
| 2,749,175 | King et al. | June 5, 1956 |
| 2,886,197 | Harris | May 12, 1959 |